United States Patent [19]

Buschmann et al.

[11] Patent Number: 4,661,919
[45] Date of Patent: Apr. 28, 1987

[54] TIMING DEVICE FOR PRINTING MACHINES

[75] Inventors: Falk Buschmann, Coswig; Karl-Heinz Foerster, Dresden; Volker Eichler, Weinboehla; Hartmut Heiber, Radebeul; Volker Dittrich, Coswig, all of German Democratic Rep.

[73] Assignee: Veb Kombinat Polygraph "Werner Lamberz" Leipzig, Leipzig, German Democratic Rep.

[21] Appl. No.: 623,911

[22] Filed: Jun. 25, 1984

[30] Foreign Application Priority Data

Jun. 23, 1983 [DD] German Democratic Rep. .................................. 2522733

[51] Int. Cl.$^4$ ...................... G04G 3/00; G05B 11/26; B41F 5/00
[52] U.S. Cl. .................................... 364/569; 101/184; 364/523
[58] Field of Search ........................ 364/523, 565, 569; 101/183, 184; 250/231 SE

[56] References Cited

U.S. PATENT DOCUMENTS

| | | | |
|---|---|---|---|
| 4,036,190 | 7/1977 | Bigliani et al. | 364/431.04 X |
| 4,116,125 | 9/1978 | Förster et al. | 101/184 X |
| 4,181,962 | 1/1980 | West, Jr. et al. | 364/565 |
| 4,296,471 | 10/1981 | Goux | 364/565 X |
| 4,496,989 | 1/1985 | Hirosawa | 364/523 X |
| 4,511,797 | 4/1985 | Pohlig et al. | 250/231 SE |

FOREIGN PATENT DOCUMENTS 2220601 12/1972 Fed. Rep. of Germany ...... 364/523

*Primary Examiner*—Felix D. Gruber
*Attorney, Agent, or Firm*—Michael J. Striker

[57] ABSTRACT

A central timing device for a printing machine includes an address generator in the form of a series of encoder disks arranged on a common shaft connected to the machine. The disks are provided with fixed coding indicative of angular increments relative to a reference point. The resulting binary words are applied as angular position addresses to addressing inputs of a programmable read only memory. Another device for generating addresses pertaining to momentary rotary speeds of the machine is selectively connectable to the addressing inputs of the PROM to read out at the output of the latter timing signals modified according to the rotary speeds.

5 Claims, 3 Drawing Figures

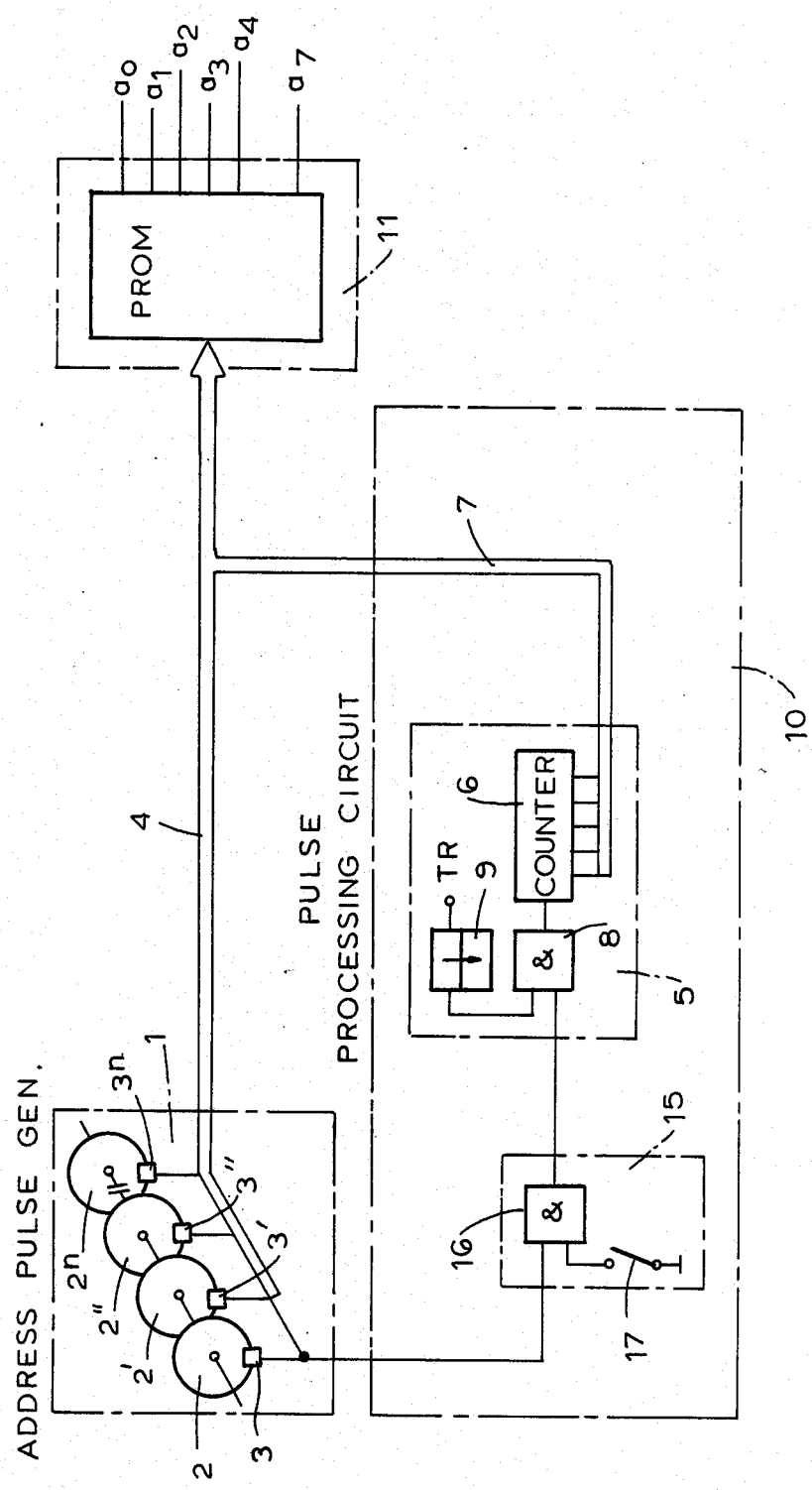
F I G. 3

TIMING DEVICE FOR PRINTING MACHINES

CROSS-REFERENCE TO RELATED APPLICATIONS

Reference is made to the copending related applications Ser. No. 623,912 filed June 25, 1984; Ser. No. 623,913 filed June 25, 1984; and Ser. No. 623,914 filed June 25, 1984, all assigned to the same assignee.

BACKGROUND OF THE INVENTION

The present invention relates in general to timing devices and in particular to timing devices for controlling the operation of rotary printing machines.

There is known a large number of types of decentralized timing devices for use in connection with printing machines which are designed for a particular application such as for example for timing the check out of the sheets, for feeding and discharging the printed matter in correctly timed succession, for timing the sorting of the sheets and the like.

From the German Pat. No. 2,220,601 a control system for multi-color rotary printing machines is known which is used for actuating the printing units of the machine or functional groups in the printing units to insure the passage of a sheet through the printing machine in correctly timed sequence. This known control device includes a pulsing stage for generating timing signals corresponding to an integrating angular position of the rotation of a cycle shaft of the printing machine. The pulse generating stage includes a signal generator, an integrating device, a signal shaper and a chain of shift registers connected to the signal shaper.

The disadvantage of this prior art, time signal generating circuit, is the fact that the pulse generating stage is designed for a single specific application only and therefore it is necessary to use many control units of this kind to control different operational functions of the printing machines.

Moreover, it is also disadvantageous that the pulse generating stage can deliver non-modified timing signals only. It cannot be employed for applications where signal modification is required, for example for generating timing signals which are dependent on rotary speed as it is frequently necessary for controlling idling times of certain elements of the printing machine.

Furthermore, in the timing devices of this kind it is frequently necessary to generate timing pulses of different lengths. The prior art device however is designed for generating non-variable lengths of the timing pulses.

SUMMARY OF THE INVENTION

It is therefore a general object of the present invention to overcome the aforementioned disadvantages.

In particular, it is an object of the machine to provide an improved timing device for rotary printing machines which from a central unit can deliver different timing signals having a high degree of reproducability and a high angular resolution.

Another object of this invention is to provide such an improved timing device which has a reduced number of component parts.

Furthermore an object of this invention is to provide a timing device in which the output timing pulses can be readily modified.

In keeping with these objects and others which will become apparent after, one feature of the invention resides, in a timing device for controlling the operation of a rotary printing machine having a cycle shaft, in a combination which comprises a reference pulse generator having a plurality of angle encoders coupled with a cycle shaft of the printing machine to generate a sequence of pulses related to the angle of rotation of the machine, and a pulse processing device including a programmable read only memory having a plurality of addressing inputs connected to the reference pulse generator and a plurality of outputs for reading out the addressed timing signals.

In the preferred embodiment, the pulse processing device includes means for generating addresses pertaining to rotary speed of the printing machine. The address generating means include a mono-stable multivibrator, an and gate having an input connected to the multivibrator, another input connected to the referenced pulse generator and an output connected to a rotary speed counter. The parallel outputs of the counter read out rotary speed addresses which are applied via a data base through the addressing inputs of the PROM.

In a modification of this invention, the pulse processing circuit includes an operational mode selector consisting of a bus driver connected between the rotary speed counter and the PROM. The bus driver is provided with a switch whose position determines the mode of operation of the timing device.

In another modification, the mode of operation selector consists of an and gate connected with one input to the reference pulse generator and with its output to the input of the first mentioned and gate in the timing circuit for the rotary speed counter. The other input of the additional and gate is connected to a switch whose position determines the mode of operation of the timing circuit.

The novel features which are considered as characteristic for the invention are set forth in particular in the appended claims. The invention itself however both as to its construction and its method of operation together with additional objects and advantages thereof will be best understood from the following description of specific embodiments when read in connection with the accompanying drawing.

BRIEF DESCRIPTION OF THE DRAWING

FIG. 3 is a modification of the timing device of FIG. 2.

DESCRIPTION OF THE PREFERRED EMBODIMENTS

Figure 1:
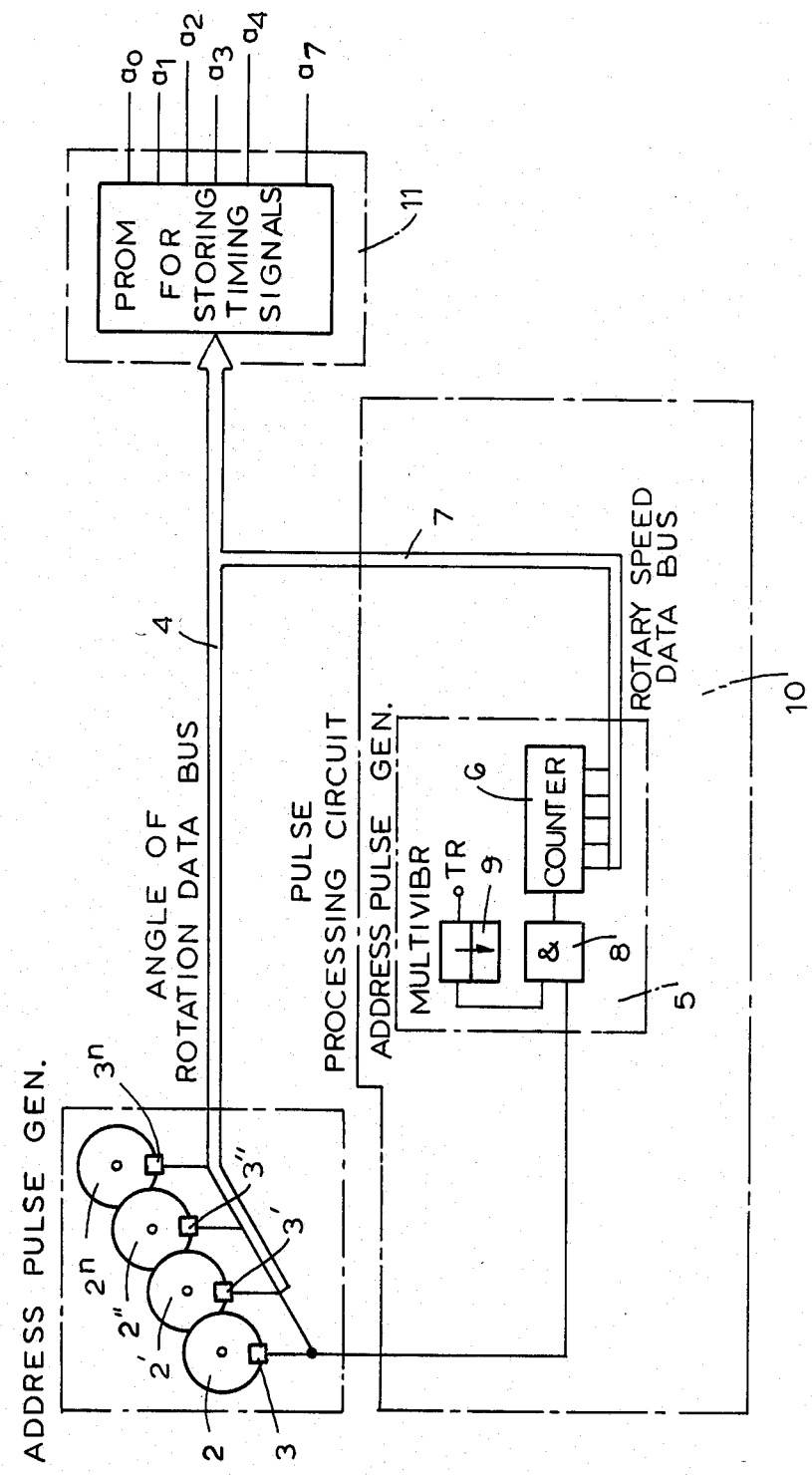
FIG. 1 is a block circuit diagram of a first embodiment of the timing device of this invention.

The timing device for controlling the operation of a printing maching includes address pulse generator 1 which consists of a series of encoding disks 2, 2', 2'' and $2^n$. The encoding disks are provided on its circumference with alternating light and dark sections rotating past stationary sensors 3, 3', 3'' and $3^n$. The sensing of encoding disks can be accomplished for example by electric means sensing radial slots in the periphery of the encoding disks.

All encoding disks are arranged on a common shaft connected to a suitable shaft in the printing machine, for example to a so-called cycle shaft which performs one rotation during one working cycle of the machine. Instead of a series of coding disks, it is also possible to employ a single coding disk provided with several coding tracks, it is the so-called multi-cycle angle encoder.

The outputs of respective sensors 3, 3', 3'', $3^n$ are connected to a data bus 4 for transferring addresses pertaining to the angle of rotation of the cycle shaft.

The device of this invention further includes a pulse processing circuit 10 including means 5 for generating addresses pertaining to the rotary speed of the machine.

The address generating means 5 includes a rotary speed counter 6 whose parallel outputs are connected to an address data bus 7 which transfers binary coded rotary speed address data to the addressing inputs of programmable storing device 11. The rotary speed address generating means 5 further includes an AND gate 8 and a monostable multivibrator 9. An input of the AND gate 8 is connected to the output of the first sensor 3 in the address pulse generator 1 and the other input of the AND gate is connected to the output of multivibrator 9. The multivibrator 9 is triggered by a control pulse at its input TR. The output of the and gate is connected to the counting input of the counter 6.

The storing device 11 is in the form of a programmable read only memory (PROM) whose addressing inputs are connected via data bus 7 to the parallel outputs of the counter 6 and via data bus 4 to the outputs of reference pulse generator 1. The outputs $a^0$ through $a^7$ of the storing device 11 serve for reading out pulse sequences corresponding to the timing signals for controlling the printing machine.

As known, PROM consists of functional blocks, such as a storing matrix in which each crossing point stores a bit of data corresponding to timing signals $a_0$ through $a_7$ which are correlated to different angles of rotation and/or to different rotary speeds of the cycle shaft of the printing machine;
- a decoding circuit consisting of column and row decoders. A row decoder reads out one row of the matrix and the column decoder simultaneously reads out 50 or more columns of the matrix. The bits stored on the addressed crossing points are then supplied to an output buffer;
- the output buffer consists of output stages which amplify the read out data bytes from the memory and make them ready for further processing;
- Y-gates which activate the columns of the matrix which have been activated by the column decoder and apply the contents of the read out columns to the output buffer.

In the exemplary embodiments of this invention the PROM consists of several address fields or ranges, as it will be described below.

Figure 2:
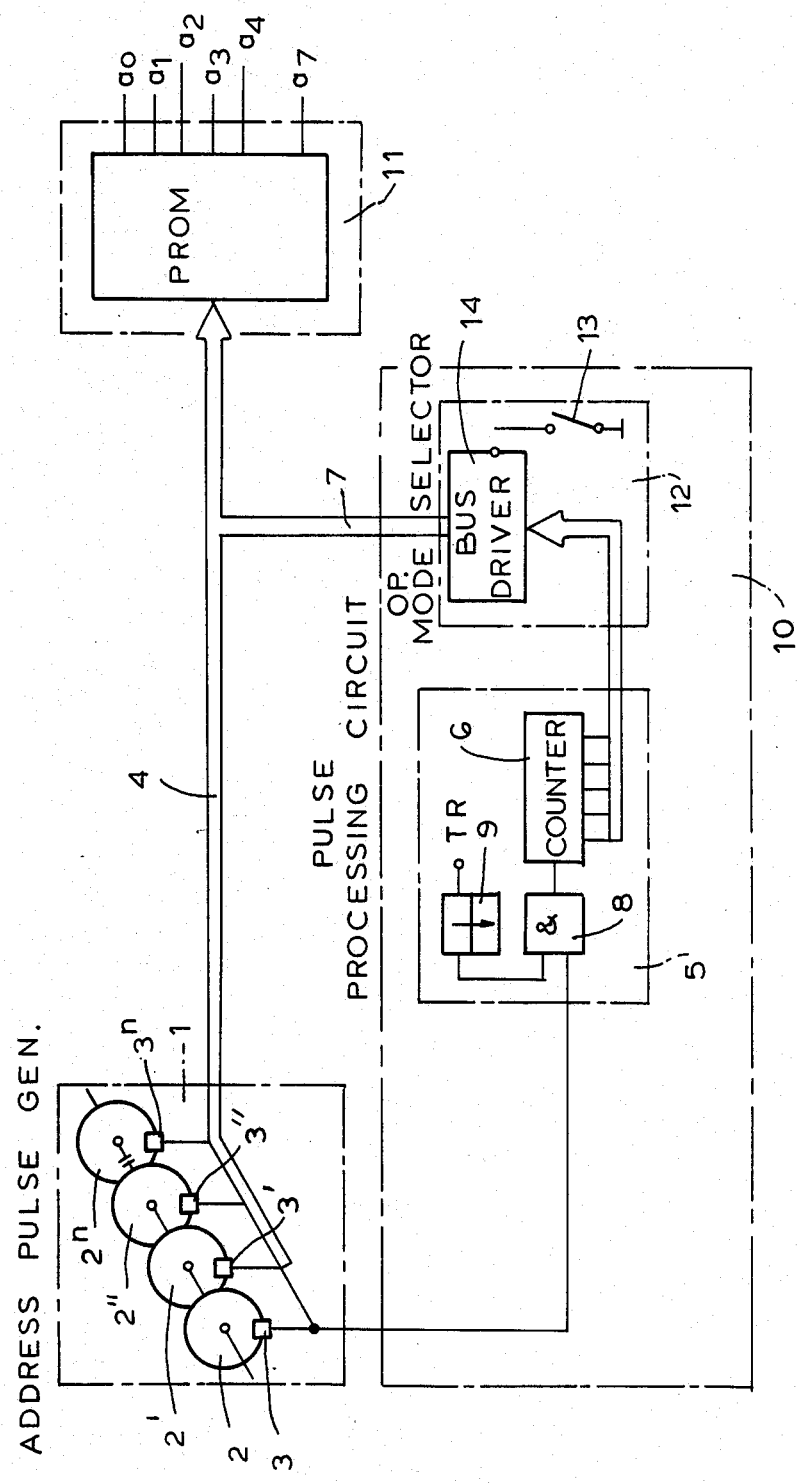
FIG. 2 is another embodiment of the device of this invention provided with an operational mode selector.

In the embodiment of FIG. 2 the pulse processing circuit 10 includes an operational mode selector 12 connected to the addressing inputs of the PROM 11. The operational mode selector is in the form of a bus driver 14 connected in series with the data bus 7 between the outputs of the rotary speed addresss generating device 5 and the inputs of the storing device 11. The control input of the bus driver is connected with a selector switch 13.

In the modification illustrated in FIG. 3, the operational mode selector 15 includes an AND gate 16. One input of the AND gate 16 is connected to a selector switch 17 while the other input is connected to the sensor 3 of the first encoder disk 2. The output of the AND gate 16 is connected to one input of the AND gate 8 of the address generating means 5.

The operation of the timing device of this invention is as follows:

after the energization of the device, the individual sensors 3, 3', 3'', $3^n$ are activated or inactivated, depending on the distribution of slots or sections according to an encoded pattern of data bits on respective encoding disks 2, 2', 2'', $2^n$ of the address pulse generator 1, corresponding to a momentary angular position of the cycle shaft of the printing machine.

The resulting binary coded word at the output of the address pulse generator 1 represents an address pertaining to the momentary angle of rotation of the machine and is transferred by data bus 4 to the inputs of the programmable storing device 11. In other words, the information transmitted by the data bus 4 corresponds to the momentary actual angular position of the cycle shaft with relation to an imaginary reference angle F.

During the rotation of cycle shaft of the machine, the successive annular increments, depending on the fixed code entered on the encoder disk 2, 2' and 2'', produce at outputs of the sensors 3, 3' and 3'' different binary signals forming together a binary coded address for the particular annular position of the cycle shaft. The consecutive binary addresses are transferred via the data bus 4 to the addressing inputs of the storing device 11. The number of addresses generated during one rotation of the cycle shaft depends on the number of encoder disks with the associated code sensors. For example if there are provided eight encoded disks there are $2^8 = 256$ of different possibilities of binary combinations, that means 256 angular addresses. As mentioned before, these 256 addresses are consecutively applied to the addressing inputs of the PROM 11. The programmable storing device 11 has been programmed to store on all these 256 addresses different bit patterns which are consecutively read out at the outputs of the device 11 and these patterns serve for controlling the timing of the printing machine.

The programming of the storing device 11 is generally known in the art and need not be described in detail in connection with this invention. It will be noted that the stored bit patterns determine the beginning and the end of timing pulses and accordingly, at individual addresses of the storing device 11 different, mutually independent sequences of pulses of different lengths can be easily entered and modified.

Example:

| Address | Stored Contents | | | | | | | |
|---|---|---|---|---|---|---|---|---|
| ∅ | ∅ | ∅ | L | ∅ | ∅ | ∅ | ∅ | ∅ |
| 1 | ∅ | L | L | ∅ | | | | |
| 2 | L | L | ∅ | ∅ | | | | |
| 3 | L | ∅ | ∅ | ∅ | | | | |
| 4 | L | ∅ | ∅ | ∅ | | | | |
| 5 | ∅ | ∅ | ∅ | ∅ | | | | |
| 256 | ∅ | ∅ | ∅ | ∅ | | | | |
| Outputs | $a_0$ | $a_1$ | $a_2$ | $a_3$ | $a_4$ | $a_5$ | $a_6$ | $a_7$ |

The outputs $a^0$ through $a^7$ correspond to the stored bits addressed by the data bus 4.

Binary data transferred by the data bus 7 and corresponding to addresses pertaining to rotary speed of the printing machine, are generated in the rotary speed address generating device as follows:

The first encoder disk 2 delivers to sensor 3 a maximum number of pulses per one revolution of the cycle shaft of the machine. These pulses are applied to one input of an AND gate 8. The monostable multivibrator 9 opens according to its preset holding time interval triggered by a control pulse at the input TR and applies its output pulse to the second input of the AND gate 8. As a result, the AND gate becomes operative during the occurrence, of the output pulse and feeds the pulses from the sensor 3 to a counter 6 where the sum of these timed pulses from the sensor 3 is available as a binary coded word at the parallel outputs of the counter 6. This binary coded word represents a rotary speed address which is transferred via data bus 7 to the addressing inputs of the storing device 11. In this manner, depending on the actuation of mode of operation selectors 12 and 15 (FIGS. 2 and 3), the addresses from the data bus 4 pertaining to the angle of rotation of the cycle shaft are combined with the addresses from the data bus 7 pertaining to the rotary speed of the cycle shaft and modified output timing signals $a_0$ to $a_7$ at the storing device 11 are read out.

As mentioned before, the momentary addresses transferred by the bus 7 are identical with the momentary angular speeds W at which the cycle shaft of the printing machine and hence the encoded disks rotate. In the illustrated embodiments, the data bus 7 transfers a binary word of a length of 4 bits which covers 16 different ranges of rotary speed.

If it is desired to modify the outputs $a_0$ through $a_7$ of the PROM 11 in dependency on rotary speed of the machine (switch 13 in the operation mode selector 12 is closed), then it is necessary to use a PROM which contains n times 250 addresses, whereby n means the number of different rotary speed ranges (n=16).

In this case, the combined address applied to the PROM is binary coded as follows:

$$2^{11}\ 2^{10}\ 2^9\ 2^8\ .\ 2^7\ 2^6\ 2^5\ 2^4\ 2^3\ 2^2\ 2^1\ 2^0$$

Rotary Speed     Angle of Rotation

Accordingly, the following pattern is read out from the PROM:

| Rotary Speed Range | Address | Stored Contents |
|---|---|---|
| 1 | 0 | 0 |
|   | 1 | L |
|   | . | . |
|   | . | . |
|   | 255 | 0 |
| 2 | 256 | L |
|   | 257 | 0 |
|   | . | . |
|   | . | . |
|   | 512 | . |
| 3 | 513 | 0 |
|   | 514 | 0 |
|   | . | . |
|   | . | . |
|   | 769 | 0 |
| 16 | 3840 | 0 |
|   | . | . |
|   | . | . |
|   | 4096 | 0 |
| Output - |  | $a_0\ a_1\ a_2\ a_3\ a_4\ a_5\ a_6\ a_7$ |

Each of the rotary speed ranges thus corresponds to a rotatation at a specific speed. By means of a corresponding programming of the storing device, it is thus possible to read out at the output of PROM 11 a timing signal for different angles of rotation when a different speed is sensed and consequently different rotary speed range is addressed.

By means of the operational mode selectors 12 or 15 the device 5 for generating addresses pertaining to the rotary speed can be switched off or the data bus 7 can be interrupted. That means that in this case only the angle of rotation addresses are transferred to the addressing inputs of the PROM and consequently only a single addressing range is continuously read out from the storing device.

It will be understood that each of the elements described, or two or more together may also find a useful application in other types of constructions differing from the types described above.

While the invention has been illustrated and described as embodied in specific examples of the timing device for printing machines, it is not intended to be remitted to the details shown since various modifications and structural changes may be made without departing in any way from the spirit of the present invention.

Without analysis the foregoing will so fully reveal the gist of the present invention that others can by applying current knowledge readily adapt it for various applications without omitting features that from the standpoint of prior art fairly constitute essential characteristics of the generic or specific aspects of this invention.

What is claimed as new and desired to be protected by Letters Patent is set forth in the appended claims:

1. A timing device for controlling the operation of rotary printing machines, comprising a pulse generator having encoding means coupled to the printing machine to generate a sequence of coded addresses related to the angle of rotation of the machine, a pulse processing device coupled to the encoding means, and a programmable storing device for storing data corresponding to predetermined timing signals assigned to respective angles of rotation, said storing device having a plurality of addressing inputs connected to the address generator and a plurality of outputs for reading out the addressed timing signals.

2. A timing device as defined in claim 1, wherein the pulse processing device further includes means for generating addresses pertaining to rotary speeds of the machine, the address generating means including a counter having a plurality of outputs and an input, an AND gate and a monostable multi-vibrator for generating an output pulse for a predetermined time interval, one input of the AND gate being connected to the encoding means of the address generator and the other input of the AND gate being connected to the monostable multivibrator and the output of the AND gate being connected to the input of the counter whereby the binary coded address at the parallel outputs of the counter are transferred via a data bus to the addressing inputs of the PROM.

3. A timing device as defined in claim 2 wherein the PROM has as many addressing ranges as many addresses are produced by the counter and each of said ranges being addressable by said sequence of coded addresses produced by the address generator.

4. A timing device as defined in claim 2 wherein the pulse processing device further comprises an operational mode selector including a bus driver connected between the parallel outputs of the counter and the addressing inputs of the PROM, the bus driver having a control input connected to a selector switch for connecting or disconnecting the PROM from the counter.

5. A timing device as defined in claim 2 wherein the pulse processing device comprises an operational mode selector an additional AND gate connected between an input of the first mentioned AND gate in the address generating means and the address generator, and the other input of the additional AND gate being connected via a selector switch for switching on or switching off the address generating means.

* * * * *